May 10, 1932.　　　C. M. EASON　　　1,858,004
FRICTION CLUTCH
Filed Dec. 24, 1930
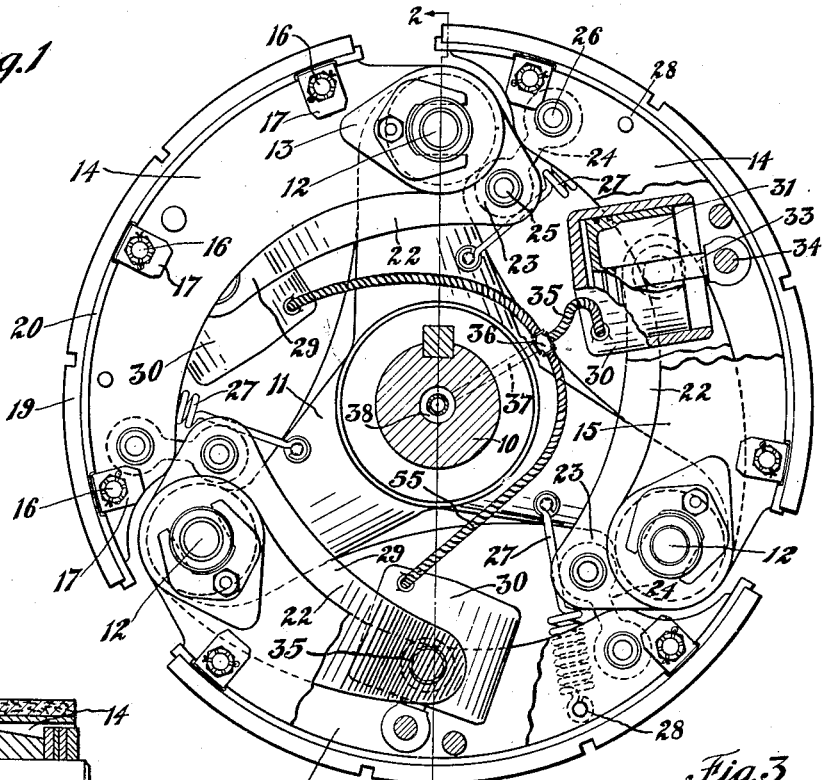
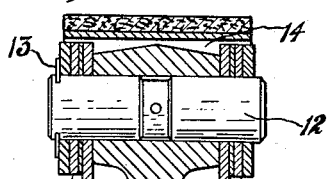
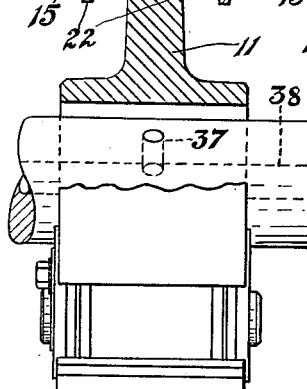
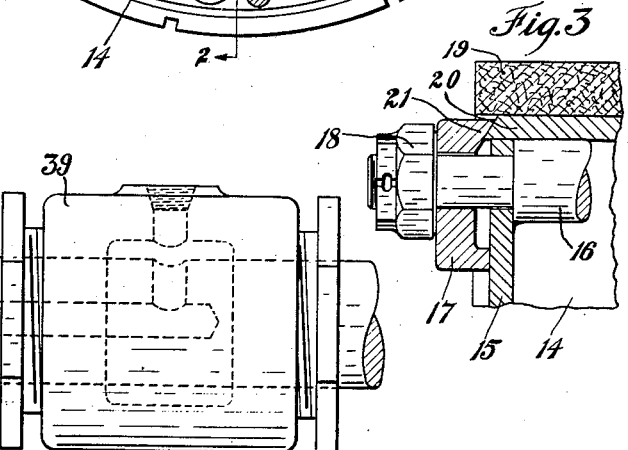
Inventor
C. M. Eason,
By Robert M. Pierson,
Attorney Patented May 10, 1932

1,858,004

UNITED STATES PATENT OFFICE

CLARENCE M. EASON, OF WAUKESHA, WISCONSIN, ASSIGNOR TO FAWICK MANUFACTURING COMPANY, OF WAUKESHA, WISCONSIN, A CORPORATION OF WISCONSIN

FRICTION CLUTCH

Application filed December 24, 1930. Serial No. 504,507.

This invention relates to friction clutches, and particularly the larger sizes of radially-acting shoe clutches adapted for the transmission of heavy powers.

The object of my invention is to provide improved means of a simple and reliable character for applying a power medium, such as a pressure fluid, to the operation of the clutch. In many situations where large power is transmitted the force required to throw the clutch parts into and out of engagement exceeds the physical strength of one man, but with the use of my invention this operation is rendered much easier.

Of the accompanying drawings, Fig. 1 is a transverse section and rear elevation showing a clutch provided with a preferred embodiment of my invention.

Fig. 2 is a side elevation and section on the line 2—2 of Fig. 1.

Fig. 3 is an enlarged fragmental section of one of the friction shoes.

In the drawings I have illustrated the driven unit of a friction clutch of the radially-acting shoe type adapted to be engaged by outward movement of its shoes against the flange or rim of an engine flywheel or a pulley acting as the driving member.

10 is a driven shaft and 11 is a three-armed shoe-supporting spider having its hub keyed to said shaft. The outer end of each spider arm is formed as a bearing for a pivot pin 12 to which is affixed by means of a U-shaped key 13 one cheek plate of an arcuate friction shoe 14 which straddles its bearing on the spider arm. The shoe frame is made up of the side or cheek plates 15 and a suitable number of cross bars or pins attached thereto, preferably by welding, of which pins certain ones designated at 16 are provided with reduced ends to receive clamping plates 17 and nuts 18 for retaining a detachable wearing member consisting of a facing 19 of friction material riveted to a base plate 20, the clamps 17 each being provided with a jaw 21 formed with an undercut bevel engaging a complemental bevel on the edge of said base plate.

Each clutch shoe 14 bridges the space between adjacent spider arms, and its free end overlies the spider arm next adjacent to the one on which the shoe is pivoted. On each of the pins 12 is pivoted a lever 22 whose short arm 23 is coupled by a link 24 with the free end of the shoe 14 next adjacent, in a direction clockwise as viewed in Fig. 1, to the shoe which is pivoted on said pin 12, the connection of said link being by means of pivot pins 25, 26 on the lever and shoe respectively. Said levers 22 also straddle the arms of spider 11, and their side or cheek plates lie between those of the shoe 14 and are journaled on the pins 12.

Pull springs 27, having their ends connected with the arms of spider 11 and with cross bars 28 on the shoes 14 respectively, are provided for releasing the shoes.

It will be evident that by the exertion of a force moving the long arm 29 of each of the levers 28 radially inward, the free end of the shoe 14 to which the short arm of said lever is coupled will be moved radially outward to engage said shoe with the driving member of the clutch.

The construction of the clutch as thus far described is not part of my invention and I may employ any suitable different form or modification, although the clutch should preferably include operating levers for the several shoes adapted for combination with individual fluid-pressure actuators substantially as hereinafter set forth.

Between each clutch shoe 14 and the operating lever 22 which is hinged on the same pivot therewith, is interposed a floating cylinder 30 attached to one of said elements, and a piston 31 therein attached to the other element. In the preferred arrangement herein illustrated, the cylinder 30 is pivoted to the long arm 29 of lever 22, between the plates of said lever, by means of trunnions 32 on the sides of said cylinder occupying bearing bushings in said side plates—the ends of the plates in the arm 29 being separated sufficiently to receive said cylinder—and the piston 31 is provided with a rigid stem or rod 33 having a cross pin 34 pivoted in bushings in the side plates 15 of the shoe body.

A pressure fluid such as compressed air is led through the shaft 10 to and from the interiors of the several cylinders 30 by means of flexible pipes 35 connecting said cylinders with a common fitting 36 whose stem is screwed through the hub of the spider 11 into the shaft 10 and connects by way of a lateral passage 37 with a longitudinal passage 38 drilled in the shaft. Said longitudinal passage connects with the interior of any suitable non-rotative fitting, such as the packed sleeve 39 on the shaft, which is piped to a suitable control valve (not illustrated) for charging and discharging the several cylinders simultaneously in parallel.

It will be noted that the action of centrifugal force upon the cylinders 30, tending to move them radially outward, is reversed in direction through the levers 22 so as to oppose or counteract the effect of said force upon the shoe 14, and the cylinders therefore act as counterbalances for the shoes.

In the operation of my invention, when it is desired to connect the engine with the driven shaft 10, the control valve is manipulated to charge the several cylinders 30, with the effect of moving each cylinder and its piston in opposite directions a distance depending upon the resistance encountered by the member with which it is connected, the cylinder carrying with it in an inward direction the long arm of the lever 22 and the piston carrying outwardly the shoe 14 until the latter contacts the driving flange of the engine flywheel or equivalent driving member. Through the short arm 23 of the lever and its connection by way of the link 24 with the free end of the next adjacent clutch shoe 14, the power of the cylinder 30 is multiplied upon said adjacent shoe and a progressive engagement of the clutch ensues with a large possible maximum pressure. The shoe pressure is maintained as long as sufficient air pressure remains in the cylinder to overcome the force of the releasing springs 27, and the amount of this clutch pressure may be controlled by varying the air pressure. When the clutch is to be released, the control valve is moved to exhaust the air from the cylinders 30 so that the shoes lose their frictional driving hold upon the driving member and are retracted by means of the springs 27.

Thus I provide a very powerful and at the same time a simple agency for the control of clutch operation, permitting one man easily and quickly to handle the largest power which it is feasible to transmit through a friction clutch. By the use of individual cylinders connected with a common source of fluid pressure, the frictional pressures of the several shoes are automatically equalized.

It will be apparent to those skilled in the art that other forms of fluid-pressure-actuated devices may be substituted for the cylinder and piston, that the mode of arranging said devices and connecting them with the cooperating members may be varied and the form of embodiment otherwise modified without departing from the scope of my invention as defined in the claims.

I claim:

1. In a friction clutch, the combination of a driven shaft, a shoe support thereon, friction shoes and operating levers pivoted to said support, and individual floating, fluid-pressure actuators respectively interposed between each of said levers and the next-adjacent shoes.

2. In a friction clutch, the combination of a driven shaft, a shoe support thereon, a plurality of friction shoes and their operating levers pivoted to said support, fluid-pressure actuators interposed between said shoes and the levers of adjacent shoes, and a conduit connection carried through said shaft for supplying fluid pressure to said actuators.

3. In a friction clutch, the combination of a radially-acting friction shoe, an operating lever therefor, and a fluid-pressure actuator including a member carried by said lever for opposing the effect of centrifugal force upon said shoe.

4. In a friction clutch, the combination of a rotary support, a plurality of friction shoes pivoted thereon, a lever pivoted on said support coaxially with one of said shoes for operating the next-adjacent shoe, and a fluid-pressure actuator including a member mounted on said lever for opposing the effect of centrifugal force upon said adjacent shoe.

5. In a friction clutch, the combination of a friction shoe, a shoe-operating lever, and a floating fluid-pressure cylinder and piston, one of which is attached to one of said members and the other to the other member.

6. In a friction clutch, the combination of a rotary support, a plurality of radially-acting friction shoes pivoted thereon, a lever pivoted on said support for operating one of said shoes, a fluid-pressure cylinder pivoted to said lever and acting as a counterbalance for opposing the action of centrifugal force on the last-said shoe, and a piston in said cylinder pivotally connected with the next-adjacent shoe.

7. In a friction clutch, the combination of a driven shaft, a shoe support thereon, a plurality of radially-acting friction shoes pivoted on said support, a plurality of levers pivoted on said support coaxially with said shoes and each adapted to operate the next-adjacent shoe, individual fluid-pressure cylinders and pistons respectively interposed floatingly between each of said levers and the shoe next to the one operated thereby, and means for charging and discharging said cylinders through said shaft.

8. In a friction clutch, the combination of a rotary driven support, a friction shoe and a shoe-operating lever both pivoted to said support, and a fluid-pressure floating actuator interposed between said shoe and lever.

In witness whereof I have hereunto set my hand this 11th day of December, 1930.

CLARENCE M. EASON.